US007490720B2

(12) United States Patent
Cole et al.

(10) Patent No.: US 7,490,720 B2
(45) Date of Patent: Feb. 17, 2009

(54) GREETING CARD SYSTEM INCLUDING A WINDOW TO ALLOW FOR INVENTORY AND ACTIVATION

(75) Inventors: Val Cole, Santa Cruz, CA (US); Ted Biskupski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 11/115,047

(22) Filed: Apr. 25, 2005

(65) Prior Publication Data

US 2006/0243609 A1 Nov. 2, 2006

(51) Int. Cl.

| | |
|---|---|
| ***B65D 71/00*** | (2006.01) |
| ***B65D 27/04*** | (2006.01) |
| ***G09F 1/04*** | (2006.01) |
| ***G06F 17/00*** | (2006.01) |
| ***B42D 15/10*** | (2006.01) |

(52) U.S. Cl. ...................... 206/232; 40/124.06; 229/70; 229/71; 235/380; 283/101

(58) Field of Classification Search ................. 206/232; 229/70–72, 92.8; 40/124.01, 124.06, 124.11; 235/379–382, 486–487, 492–493

See application file for complete search history.

(56) References Cited

U.S. PATENT DOCUMENTS

| | | | | |
|---|---|---|---|---|
| 1,491,675 | A * | 4/1924 | Conklin | 229/92.8 |
| 6,315,206 | B1 * | 11/2001 | Hansen et al. | 235/487 |
| 6,666,378 | B2 * | 12/2003 | Davila et al. | 235/487 |
| 6,732,459 | B1 * | 5/2004 | Clark | 40/124.06 |
| 6,978,562 | B2 * | 12/2005 | Frenkel | 40/124.06 |
| 7,024,807 | B2 * | 4/2006 | Street | 40/124.06 |
| 7,040,049 | B2 * | 5/2006 | Cox et al. | 40/124.11 |
| 7,055,740 | B1 * | 6/2006 | Schultz et al. | 235/381 |
| 2002/0100797 | A1 * | 8/2002 | Hollingsworth et al. | 229/92.8 |
| 2003/0004889 | A1 * | 1/2003 | Fiala et al. | 705/64 |
| 2004/0118914 | A1 * | 6/2004 | Smith et al. | 235/380 |
| 2006/0091202 | A1 * | 5/2006 | McInnis | 235/381 |
| 2006/0231609 | A1 * | 10/2006 | Lazarowicz et al. | 235/380 |

* cited by examiner

*Primary Examiner*—Bryon P Gehman
(74) *Attorney, Agent, or Firm*—Sawyer Law Group LLP

(57) ABSTRACT

A greeting card system comprises a card member. The card member includes a first window. The system includes a gift card attached to the card member. The gift card is activated through use of a code that is displayed in the first window. Accordingly, a greeting card system is provided that allows for immediate use of a gift card. The system minimizes fraud or theft of the card through the use of an activation code thereon.

20 Claims, 4 Drawing Sheets

GREETING CARD SYSTEM INCLUDING A WINDOW TO ALLOW FOR INVENTORY AND ACTIVATION

FIELD OF THE INVENTION

The present invention relates generally to a greeting card and more specifically to a greeting card which also contains a gift card.

BACKGROUND OF THE INVENTION

At present, greeting cards are purchased, and gift cards are purchased. Heretofore a person purchasing both would typically have to go to two different sources to obtain both the greeting card and gift card, or at the very least would have to make two different purchases.

An additional issue is that a gift card must also be activated prior to its use, requiring an additional step before the customer can make immediate use of the gift card. What is needed is a system that overcomes the above-identified issues. The present invention addresses such a need.

BRIEF SUMMARY OF THE INVENTION

A greeting card system is disclosed. The greeting card system comprises a card member. The card member includes a first window. The system includes a gift card attached to the card member. The gift card is activated through use of a code that is displayed in the first window.

Accordingly, a greeting card system is provided that allows for immediate use of a gift card. The system minimizes fraud or theft of the card through the use of an activation code thereon.

DETAILED DESCRIPTION OF THE INVENTION

The present invention relates generally to a greeting card and more specifically to a greeting card which also contains a gift card. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
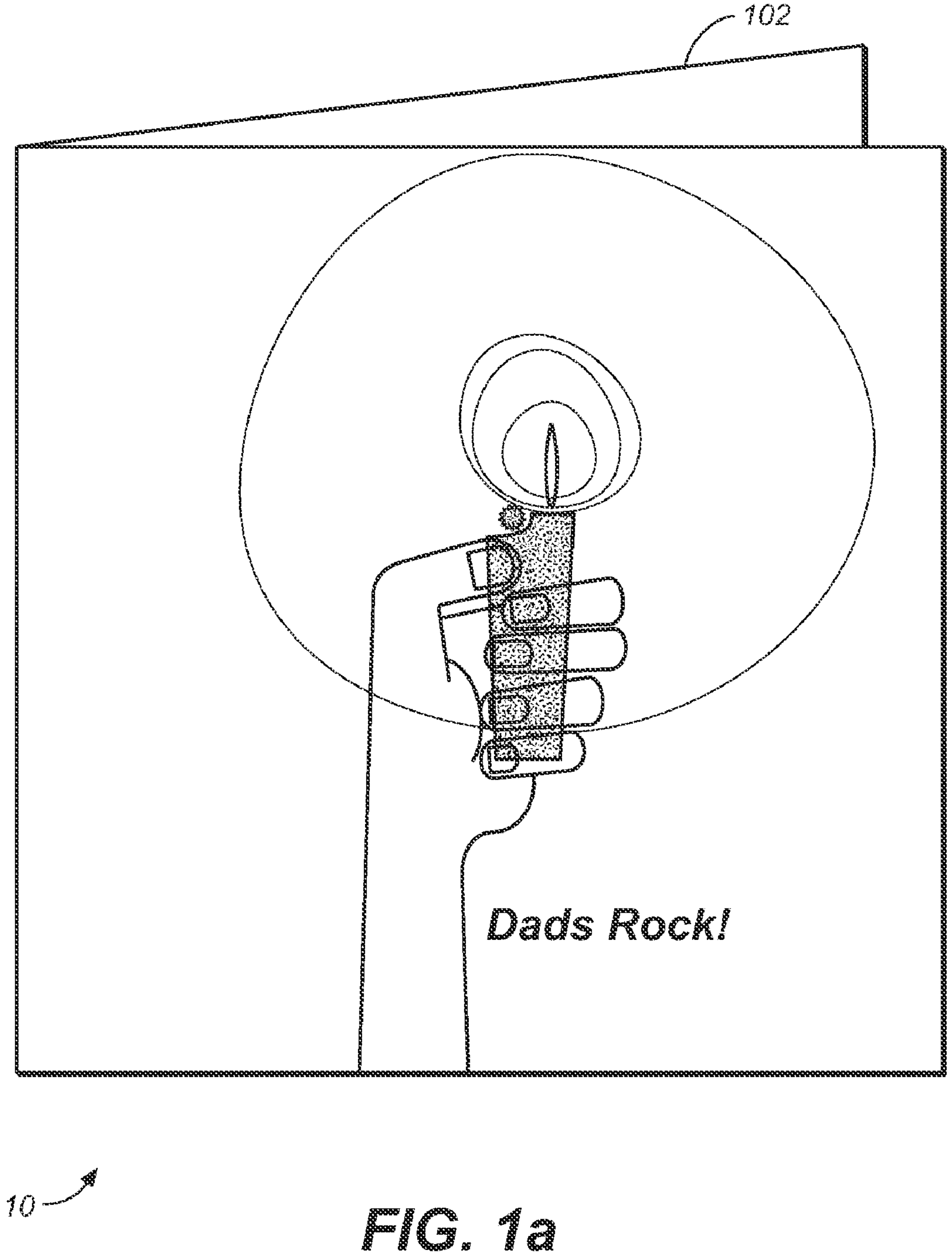
FIG. 1*a* illustrates the front of a greeting card in accordance with the present invention.
Figure 1B:
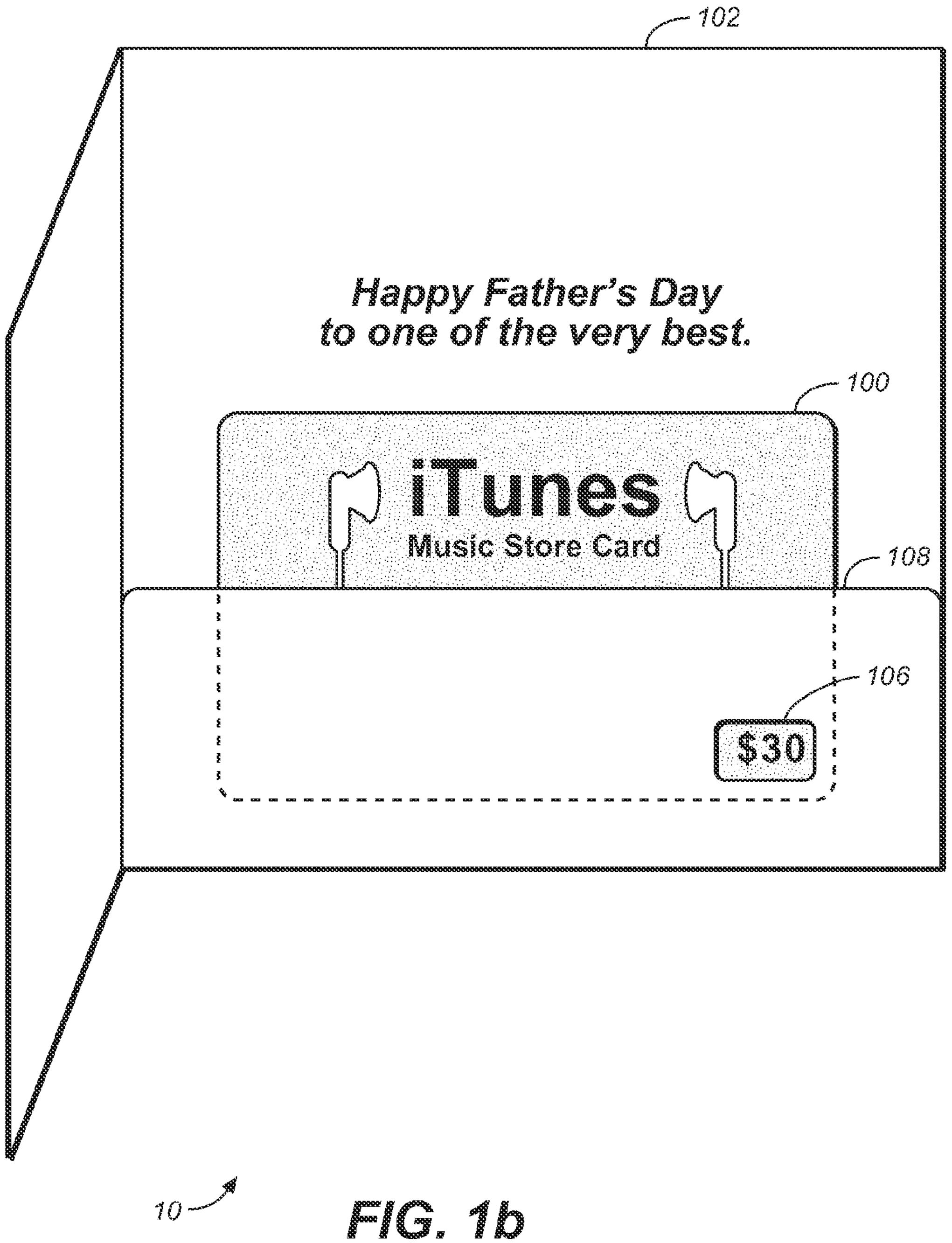
FIG. 1*b* shows the inside of a greeting card in accordance with the present invention.

FIGS. 1*a* and 1*b* illustrate a greeting card system 10 in accordance with the present invention. FIG. 1*a* illustrates the front of the greeting card system 10. In this embodiment, the greeting card system comprises a father's day card. However, one of ordinary skill in the art readily recognizes that the greeting card could be a variety of cards such as mother's day cards, birthday cards, graduation cards, etc., and their use would be within the spirit and scope of the present invention.

FIG. 1*b* shows the inside of the greeting card system 10 after the greeting card system 10 has been opened. As is seen, the greeting card system 10 includes a card member 102 and a gift card 100 therewithin. The gift card 100 is fastened to the card member 102 with a substance such as glue or the like, although the gift card 100 can be removed from the greeting card if the user desires or needs to do so. Accordingly in a preferred embodiment the gift card and the card member are sold as a single integral unit.

As is seen in FIG. 1*b*, the gift card 100 has a $30 value as shown in the opening 106 on the front of a pocket 108 inside the card member 102. Although a thirty ($30) dollar gift card is shown in this embodiment, the gift card 100 could be for any value and its use would be within the spirit and scope of the present invention. The gift card 100 can be utilized with a variety of environments, such as purchasing books, clothing, food items, and many other items of the like. In a particular embodiment the gift card is utilized for a music site such as iTunes owned by Apple, Inc. Although a system and method in accordance with the present invention is not limited to a gift card which is utilized with a music site, there are particular advantages thereto which will be explained in more detail herein below.

Figure 1C:
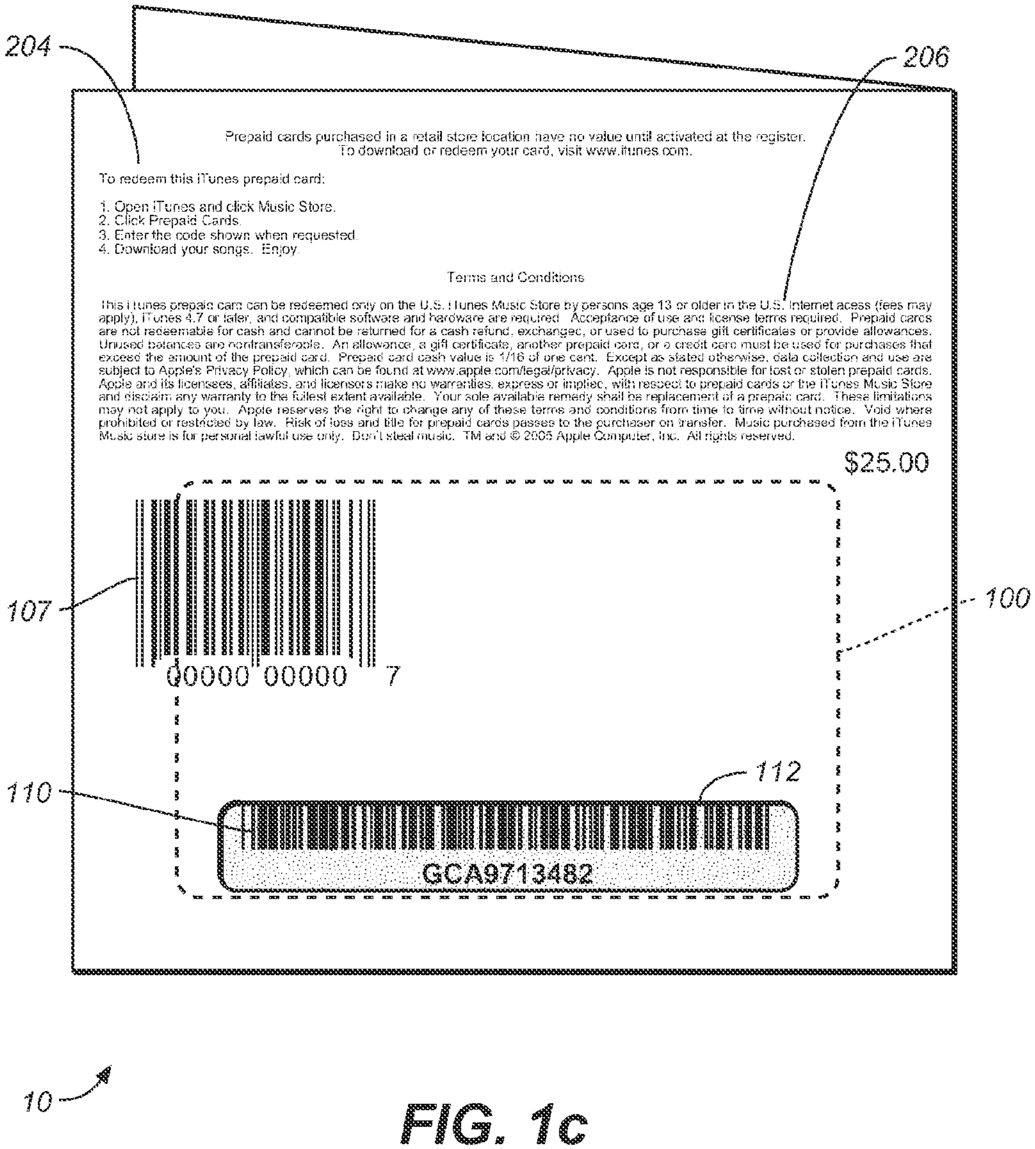
FIG. 1*c* illustrates the back of a greeting card in accordance with the present invention.

FIG. 1*c* illustrates the back of the greeting card system 10. As is seen, possession of the greeting card system 10 makes it possible for the user to download one or more music files from the Internet from a music site such as iTunes. A first bar code 107 is utilized to sell the greeting card system 10. A second bar code 110 for activating the gift card 100 is displayed on the back of the card member 102. This bar code 110 is designed to be displayed through a window 112 on the back of the greeting card 10. The bar code 110 in a preferred embodiment allows the seller of the greeting card system 10 to activate the gift cad 100 such through a bar code reader and therefore minimizes fraud and theft. In addition the second bar code 110 allows for information to be transmitted to a database of the music site or the like about the card 100. Accordingly, the first and second bar codes 107 and 110 are utilized to manage the sale of the greeting card system 10 and to provide for activation of the gift card 100 and the inventory of the gift card 100 by a web site, such as music site.

In addition to language 204 authorizing permission to download music files shown on the back side of the greeting card 10, additional language 206 may also be printed on the back of the greeting card 10, including language explaining how to utilize the attached gift card, expiration information, additional marketing language, legal language relating to limitations and protections, and patent and copyright information as needed.

Figure 2:
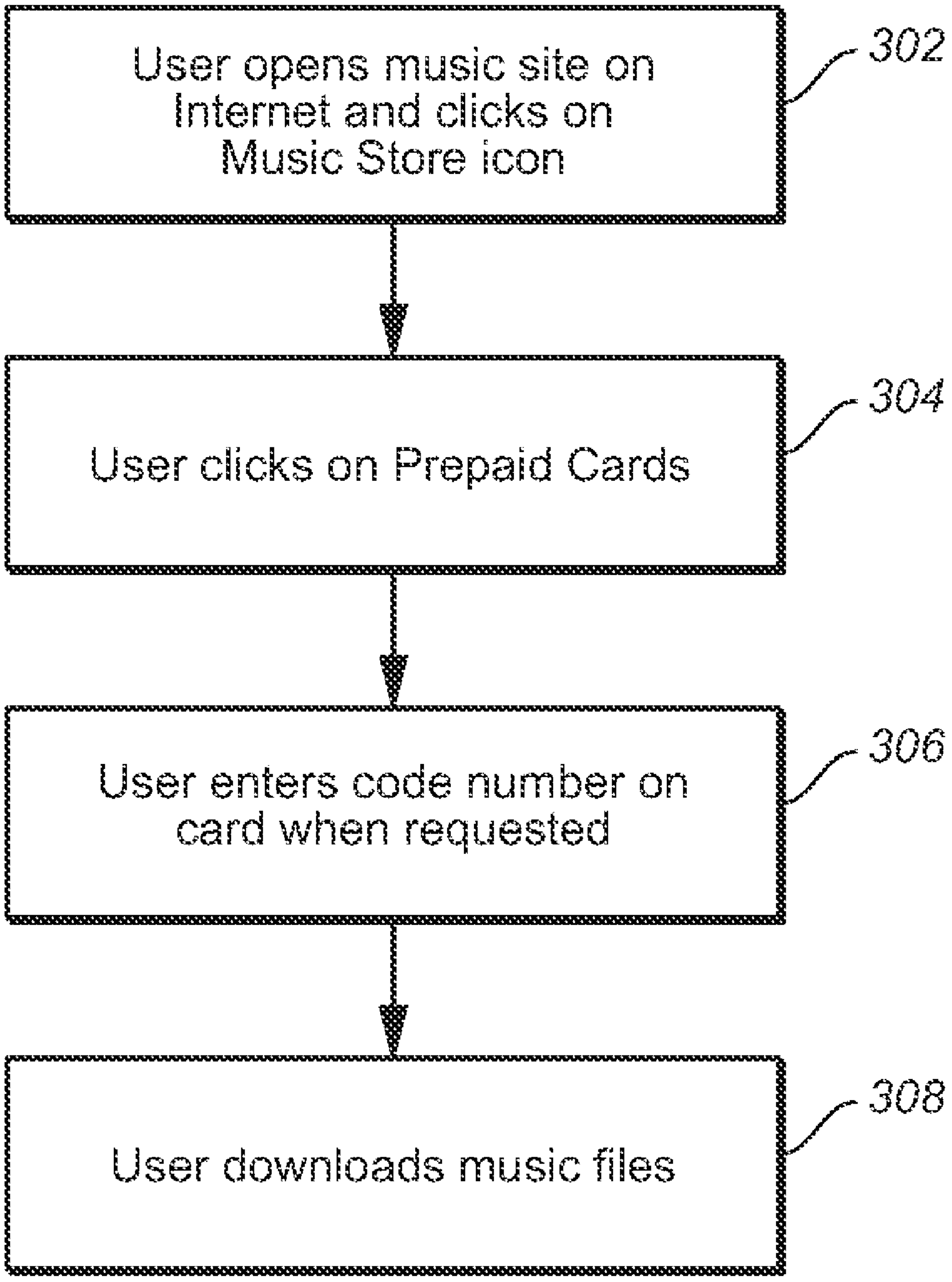
FIG. 2 is a flow chart illustrating the steps for downloading music files from a music site.

The greeting card system 10 can be utilized to download music files from a music site such as iTunes. To describe this feature in more detail, refer now to the following discussion in conjunction with FIG. 2. To download a music file, the user first opens a music site on the Internet and clicks on a Music Store icon, via step 302. Next, the user clicks on prepaid cards, via step 304. Then, the user enters the code number on the card when requested, via step 306. Finally, the user downloads the music file, via step 308.

Additionally, if desired, it may be possible to obtain marketing information from the use of the cards, if users are asked to fill out personal information forms on the internet before a music file is delivered. Yet another advantage to the greeting cards in accordance with the present invention is that not only are they much easier for the customer to use, they also make distribution of music available among a wider base of customers, overcoming the physical, fuel and personnel costs of distribution of CDs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A greeting card system, comprising:

a card member having an inside portion and an outside portion, the card member including a first window;

a pocket on the inside portion of the card member dimensionally configured to removably receive a gift card, being situated over the first window, and the pocket having a second window; and a gift card removably attached to the inside portion of the card member and fitted within the pocket, having an indicia on a first side and a code on a second side, wherein the gift card is activated through use of the code that is displayed through the first window, the code is visible through the first window, and the indicia is visible through the second window.

2. The greeting card system of claim 1 wherein the card member and the gift card are a single integrated unit.

3. The greeting card system of claim 1 wherein the code comprises a bar code on the gift card.

4. The greeting card system of claim 1 wherein the gift card is utilized for downloading music from a music site.

5. The greeting card system of claim 1 wherein the second window is for displaying the amount of the gift card.

6. The greeting card system of claim 5 wherein the first window is on a back portion of the card member and the second window is on the inside portion of the card member.

7. The greeting card system of claim 1 wherein the card member includes information for downloading music from a music site.

8. The greeting card system of claim 1 wherein a second bar code is located on a back portion of the card member and is utilized for selling the greeting card system.

9. A greeting card system, comprising:

a card member having an inside portion and an outside portion, the card member having a first window on a back portion of the card member and having a pocket on the inside portion of the card member, the pocket including a second window and being dimensionally configured to removably receive a gift card being situated over the first window; and a gift card attached to the card member and removably fitted within the pocket of the card member, the gift card having an activation code which is displayed in the first window and a monetary amount which is displayed in the second window.

10. The greeting card system of claim 9 wherein the activation code comprises a bar code on the gift card.

11. The greeting card system of claim 9 wherein the gift card is utilized for downloading music from a music site.

12. The greeting card system of claim 9 wherein the card member includes information for downloading music from a music site.

13. A greeting card system, comprising:

a card member having an inside portion and an outside portion, the card member having a first window on a back portion of the card member and having a pocket on the inside portion of the card member dimensionally configured to removably receive a gift card, being situated over the first window, and the pocket having a second window; the card member having a first bar code on the back portion; the first bar code when activated allows for the sale of the greeting card system; and a gift card attached to the card member and fitted within the pocket of the card member, the gift card having an activation code which is displayed in the first window and an indicia which is displayed in the second window.

14. The greeting card system of claim 13 wherein a monetary amount is displayed in a second window.

15. A greeting card system, comprising:

a card member having an first card and a second card, wherein the first card and second card are connected to one another, wherein the first card and the second card each have a similar area and each have a first face and a second face, the second card including a first window formed by an opening of a predetermined dimension through the first face and the second face of the second card in relation to a gift card;

a receiving pocket positioned on the first face of the second card proximate to the first window;

the pocket having a second window for displaying an indicia of the gift card, being dimensionally configured to removably receive a gift card, and being situated over the first window; and the gift card removably attached within the pocket to the first face of the second card, wherein a code for activation of the gift card having a predetermined dimension is displayed through the first window from the second side of the second card and an indicia on the gift card is displayed through the second window.

16. The greeting card system of claim 15 wherein the second card and the gift card are removably affixed to one another as a single integrated unit.

17. The greeting card system of claim 15 wherein the code comprises a scannable code on the gift card and a second window of a second predetermined dimension for displaying an amount of redeemable value of the gift card for use in an electronic environment.

18. The greeting card system of claim 15 wherein the gift card is utilized for downloading information an internet site.

19. The greeting card system of claim 15 wherein the second card includes a second window for displaying a visual value amount of the gift card.

20. The greeting card system of claim 15 further including an instruction set for use of the system displayed on a second face of the second card.

* * * * *